US006543298B2

(12) United States Patent
Cronin et al.

(10) Patent No.: US 6,543,298 B2
(45) Date of Patent: Apr. 8, 2003

(54) METHOD OF REDUCING TOTAL TEMPERATURE ERRORS AND MULTI-FUNCTION PROBE IMPLEMENTING SAME

(75) Inventors: Dennis J. Cronin, Apple Valley, MN (US); Steve F. Alwin, St. Paul, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/905,167

(22) Filed: Jul. 13, 2001

(65) Prior Publication Data

US 2003/0010109 A1 Jan. 16, 2003

(51) Int. Cl.$^7$ ................................................. G01F 1/46
(52) U.S. Cl. ............................. 73/861.65; 73/861.68; 73/170.12; 73/178 R; 73/179; 73/170.26
(58) Field of Search ........................... 73/170.12, 180, 73/182, 861.65, 861.68, 866.5, 170.02, 170.11, 204.11–204.24, 497, 179, 170.26; 374/138, 135

(56) References Cited

U.S. PATENT DOCUMENTS

| 3,318,146 | A | | 5/1967 | DeLeo et al. | |
|---|---|---|---|---|---|
| 4,096,744 | A | | 6/1978 | DeLeo et al. | 73/180 |
| 4,378,696 | A | * | 4/1983 | DeLeo et al. | 73/180 |
| 4,378,697 | A | | 4/1983 | DeLeo et al. | 73/182 |
| 5,205,169 | A | | 4/1993 | Hagen | 73/180 |
| 5,319,970 | A | | 6/1994 | Peterson et al. | 73/182 |
| 5,485,412 | A | | 1/1996 | Sarkkinen et al. | 364/724.05 |
| 5,653,538 | A | * | 8/1997 | Phillips | 374/138 |
| 5,731,507 | A | * | 3/1998 | Hagen et al. | 73/182 |

OTHER PUBLICATIONS

"BFGoodrich–Aircraft Sensors Division Air Data System with SmartProbe for Fairchiled Dornier 728JET", BFGoodrich–Rosemount Aerospace, Addendum to D9820217 Rev. B, Oct. 1998, pp. 1–10.

"SmartProbe™ Air Data System for Embraer ERJ–170 & 190", BFGoodrich–Aircraft Sensors Division, Proposal D9920133, Apr. 1999, pp. 1–65.

F.W. Hagen and Dr. H. Seidel, "Deutsche Airbus Flight Test of Rosemount Smart Probe for Distributed Air Data System", IEEE AES Systems Magazine, Apr. 1994, pp 7–14.

Bulletin 1013, "Pitot and Pitot–Static Probes", BFGoodrich (May 1998).

T.J. Rohloff, S.A. Whitmore and I. Catton, "Air Data Sensing from Surface Pressure Measurements Using a Neural Network Method", AIAA Journal, vol. 36, No. 11, Nov. 1998, pp. 2095–2101.

T.J. Rohloff, S.A. Whitmore and I. Catton, "Fault–Tolerant Neural Network Algorithm for Flush Air Data Sensing", Journal of Aircraft, vol. 36, No. 3, May–Jun. 1999, pp. 541–549.

T.J. Rohloff and I. Catton, "Fault Tolerance and Extrapolation Stability of a Neural Network Air–Data Estimator", Journal of Aircraft, vol. 36, No. 3, May–Jun. 1999, pp. 571–576.

Truman M. Stickney, Marvin W. Shedlov and Donald I. Thompson, "Total Temperature Sensors, Technical Report 5755, Revision C", Rosemount Aerospace/BFGoodrich (Jan. 1994).

* cited by examiner

Primary Examiner—Hezron Williams
Assistant Examiner—Alandra N. Ellington
(74) Attorney, Agent, or Firm—Westman, Champlin & Kelly, P.A.

(57) ABSTRACT

A method of generating, for an aircraft, a total air temperature compensated for recovery or deicing heater error includes measuring a total air temperature with a total air temperature probe. A local angle of attack for the total air temperature probe is determined. Then, a corrected total air temperature, compensated for recovery or deicing heater error, is generated as a function of the measured total air temperature and the determined local angle of attack for the total air temperature probe.

17 Claims, 10 Drawing Sheets

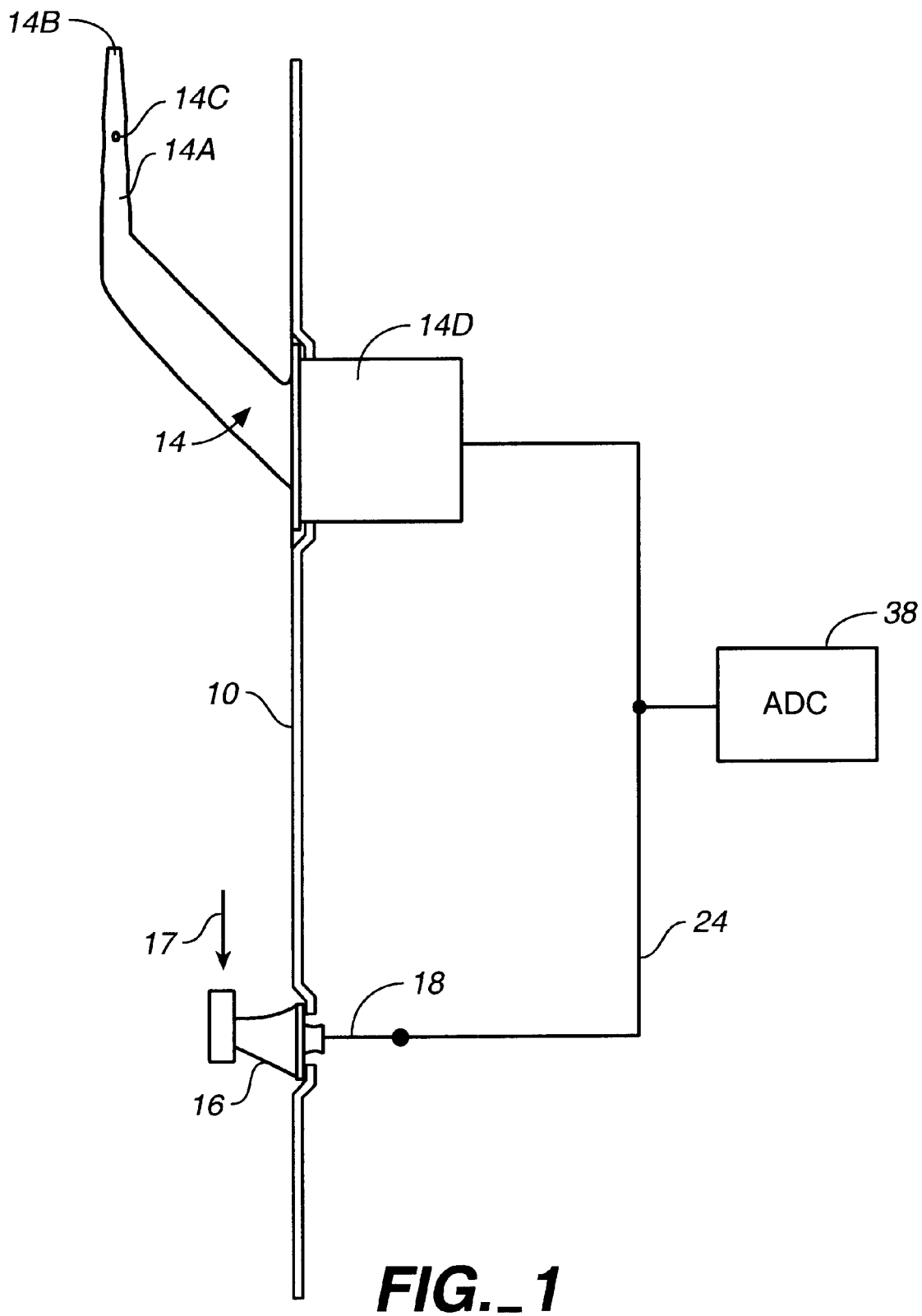
FIG._1

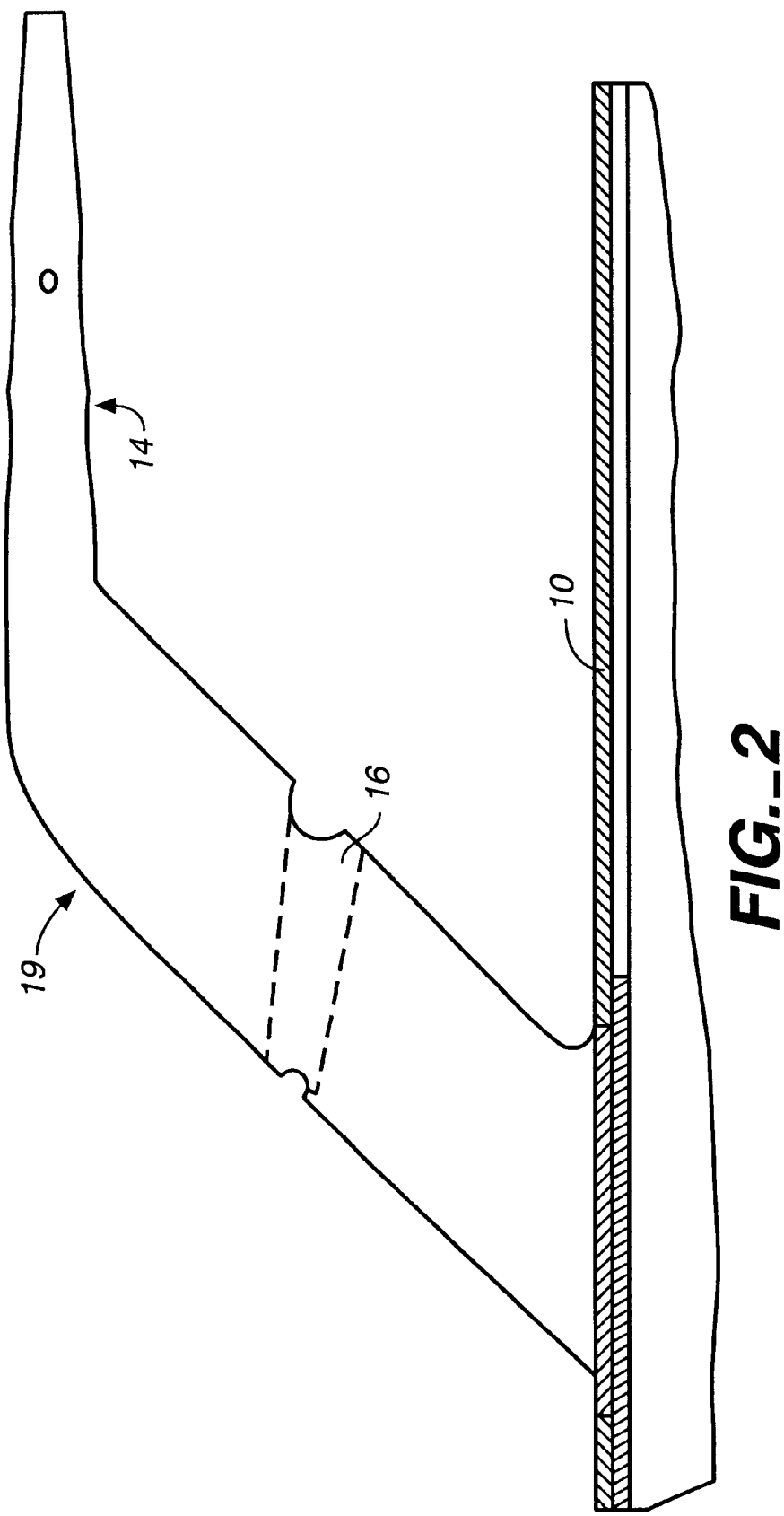
FIG._2

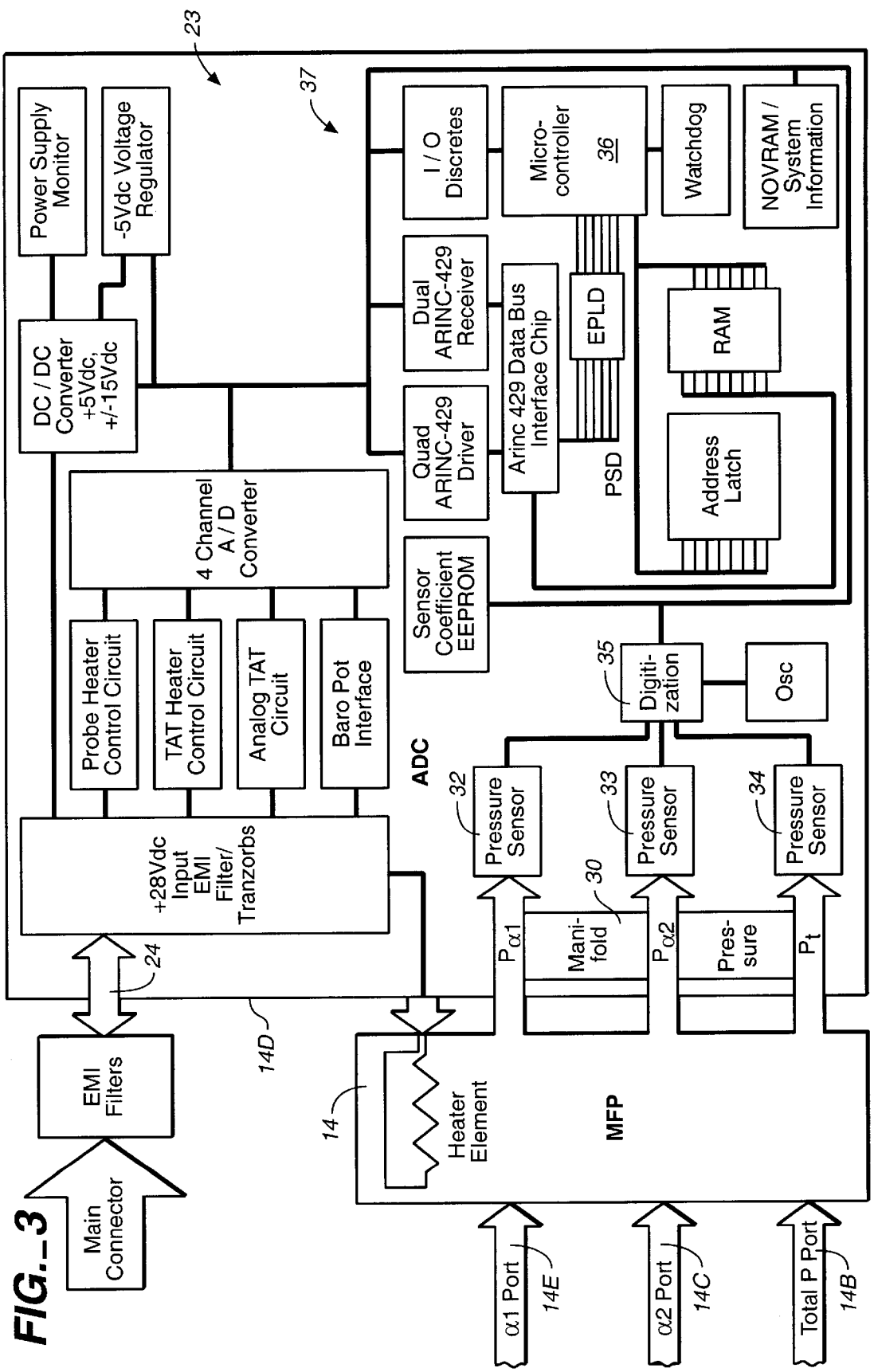
FIG._3

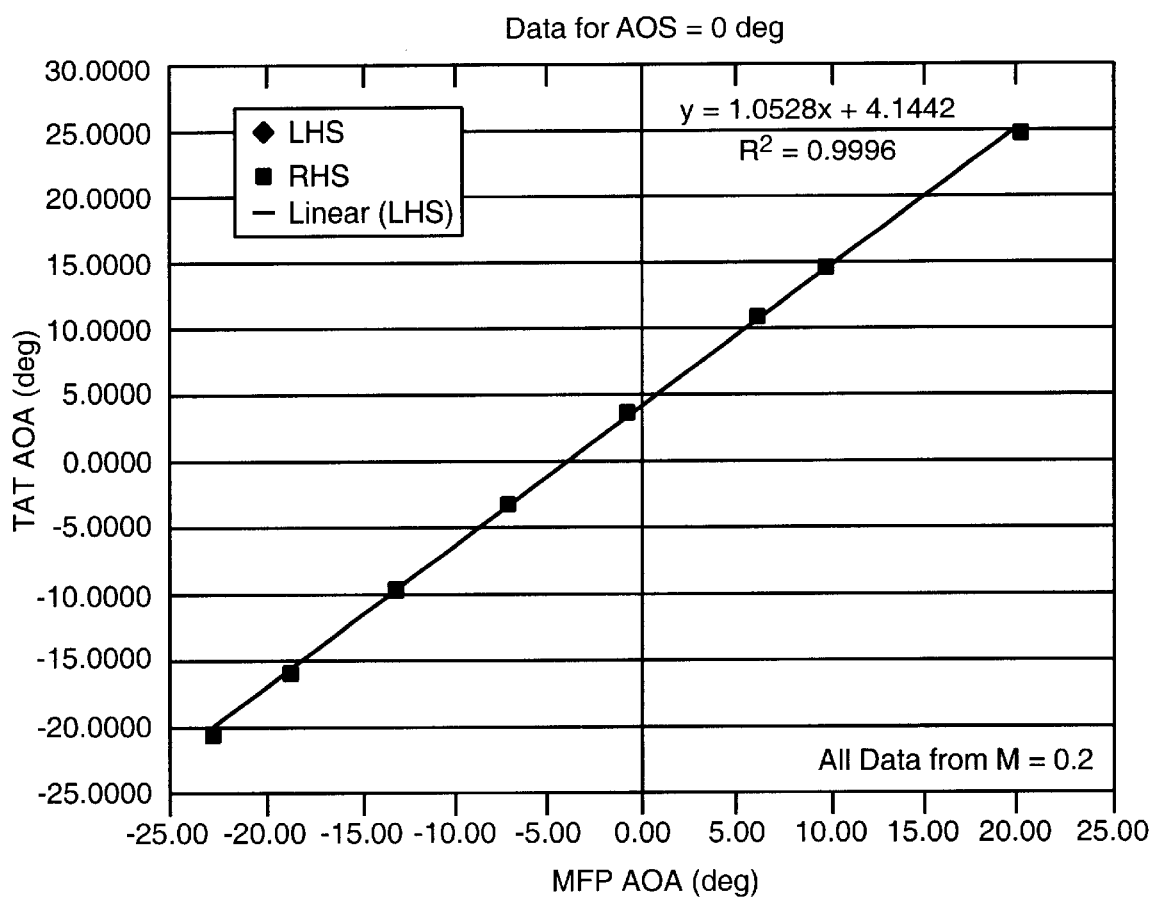
FIG._4

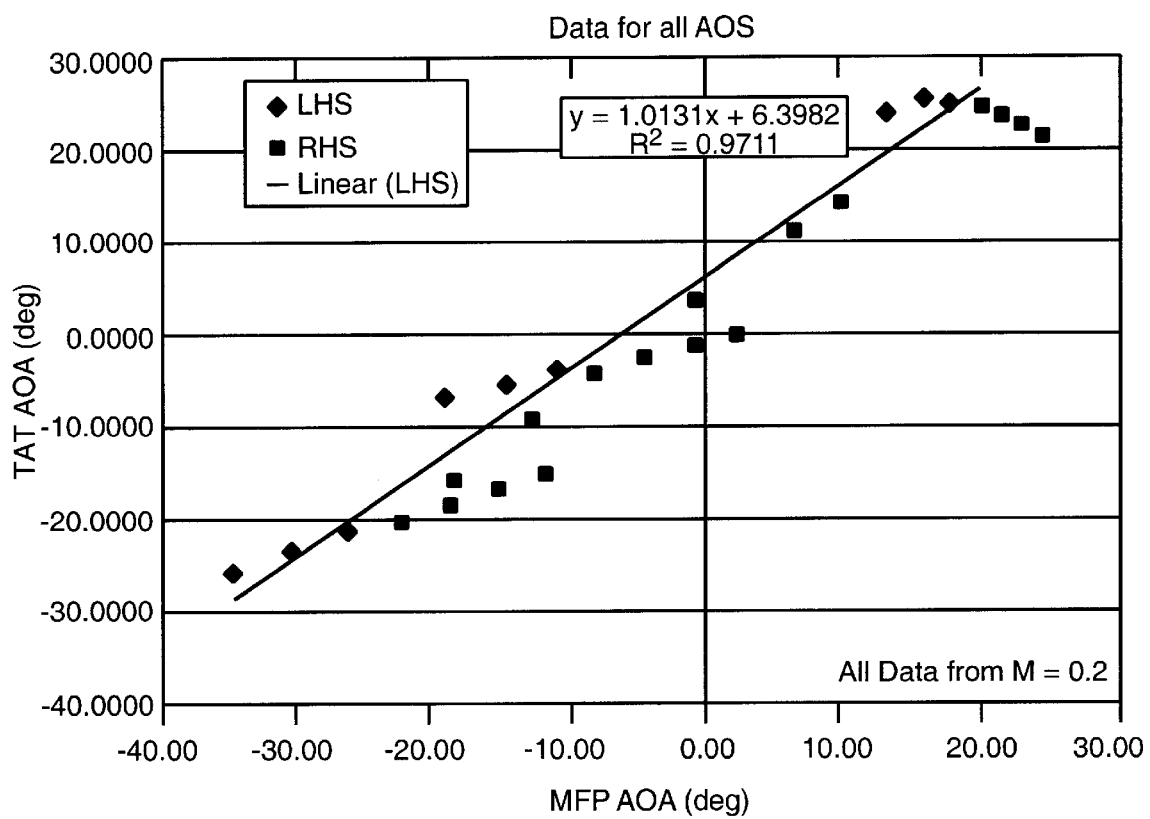
FIG._5

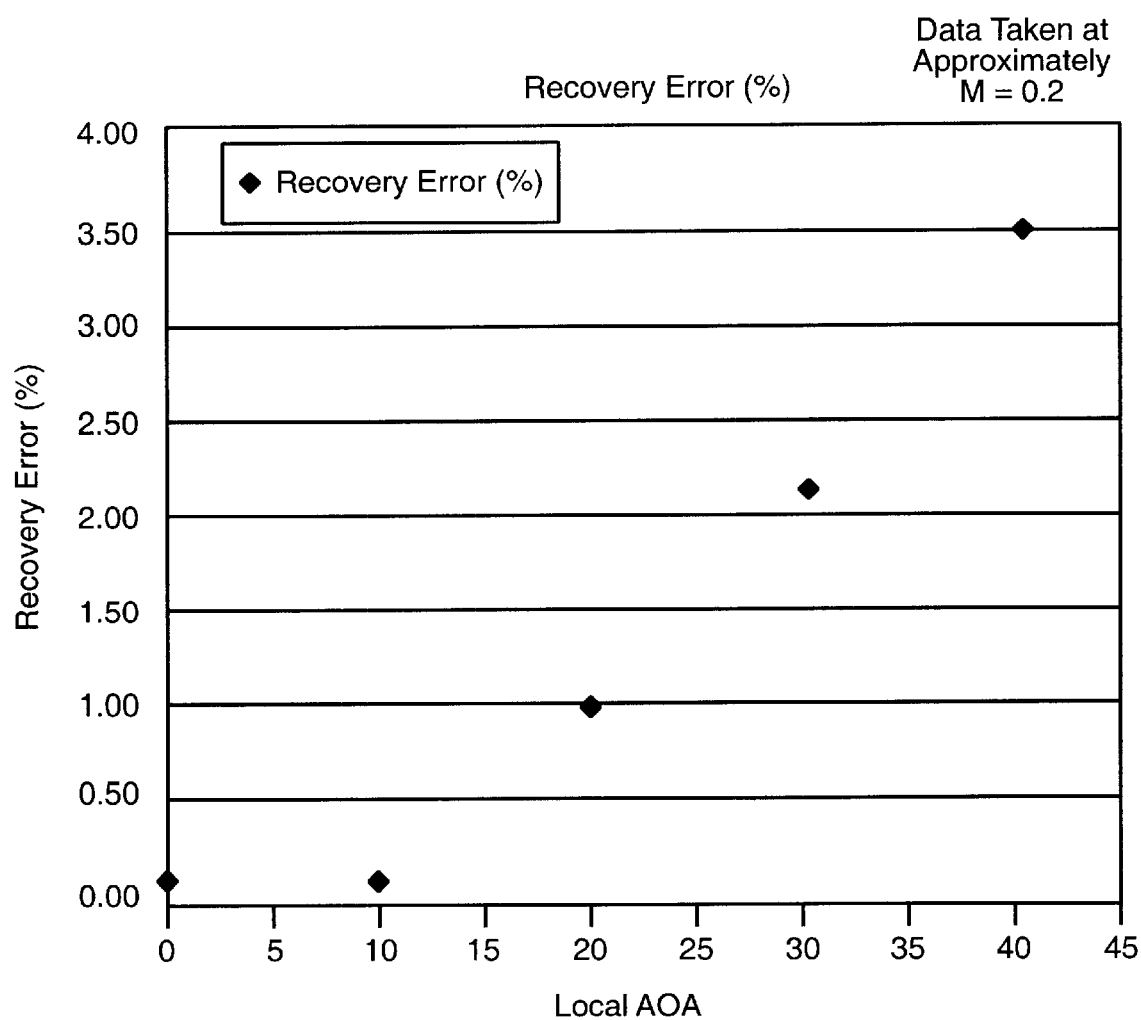
FIG._6

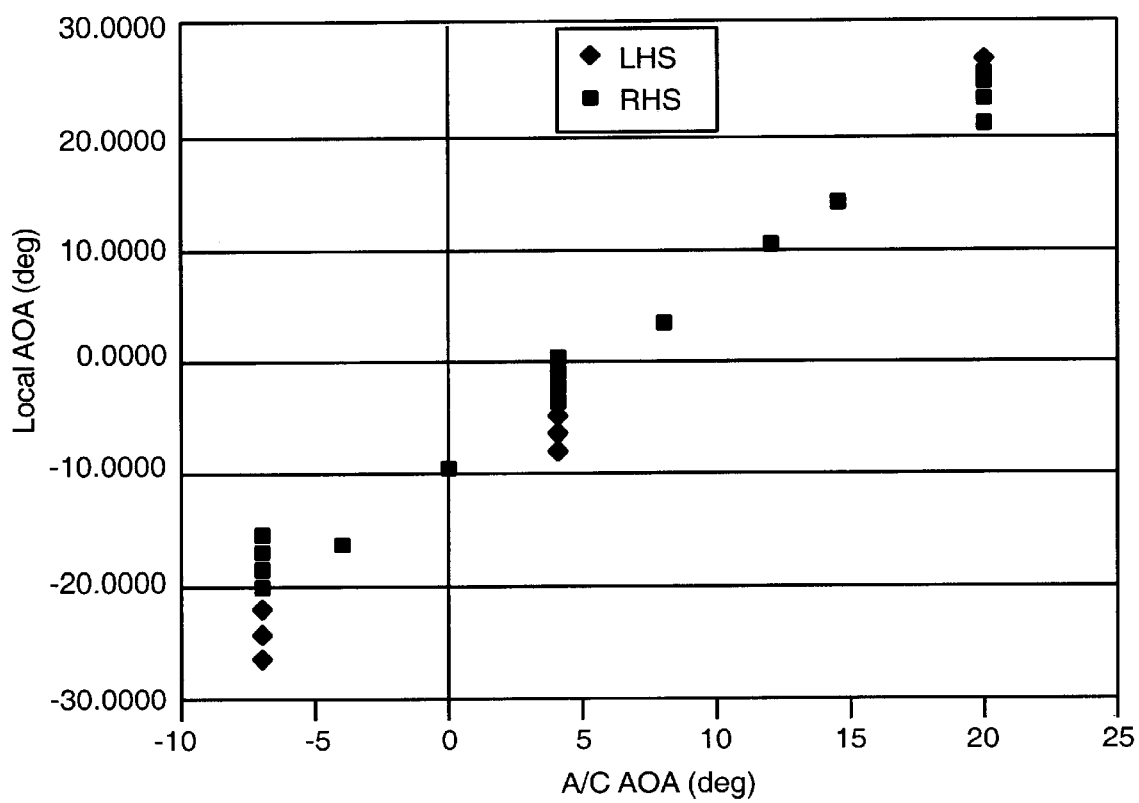
FIG._7

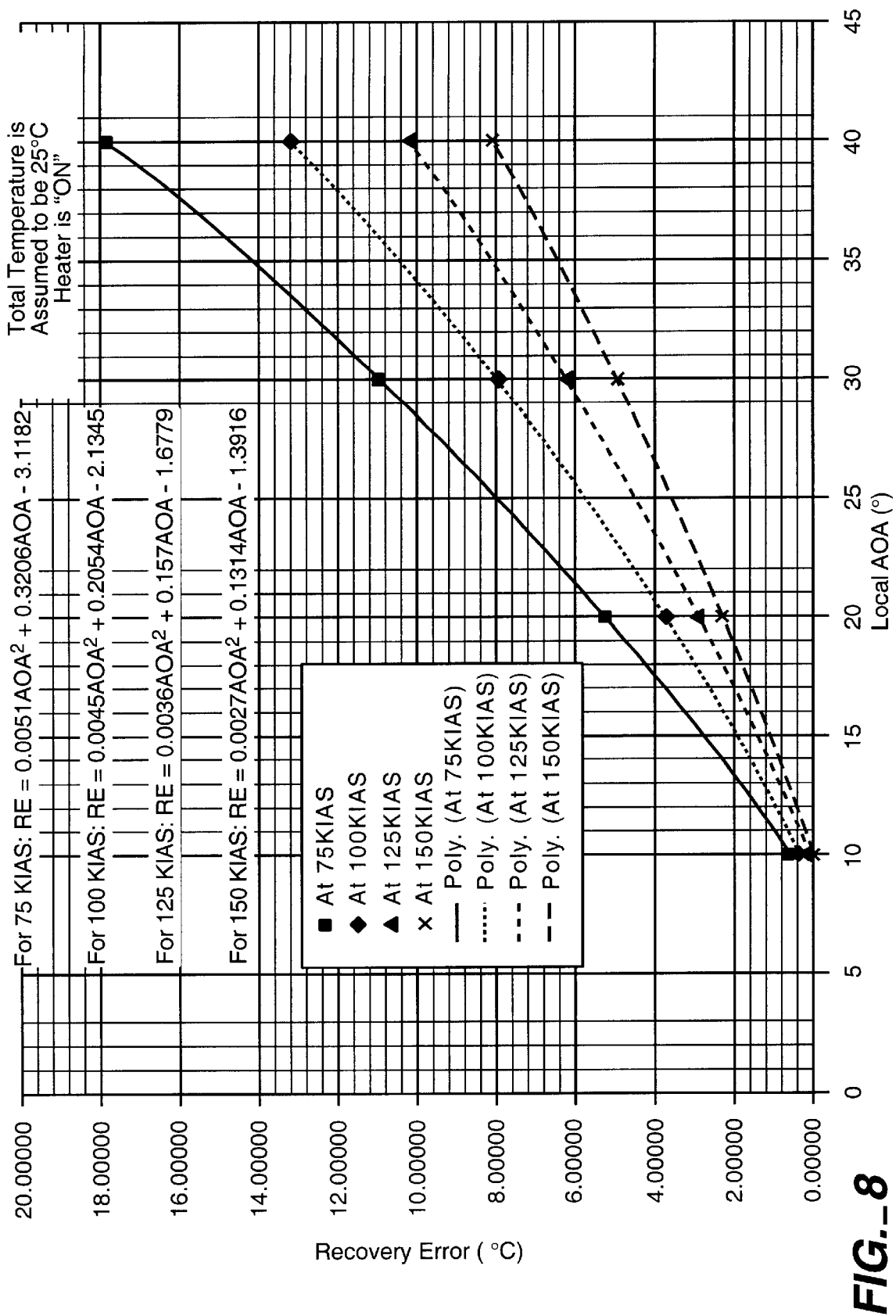
FIG._8

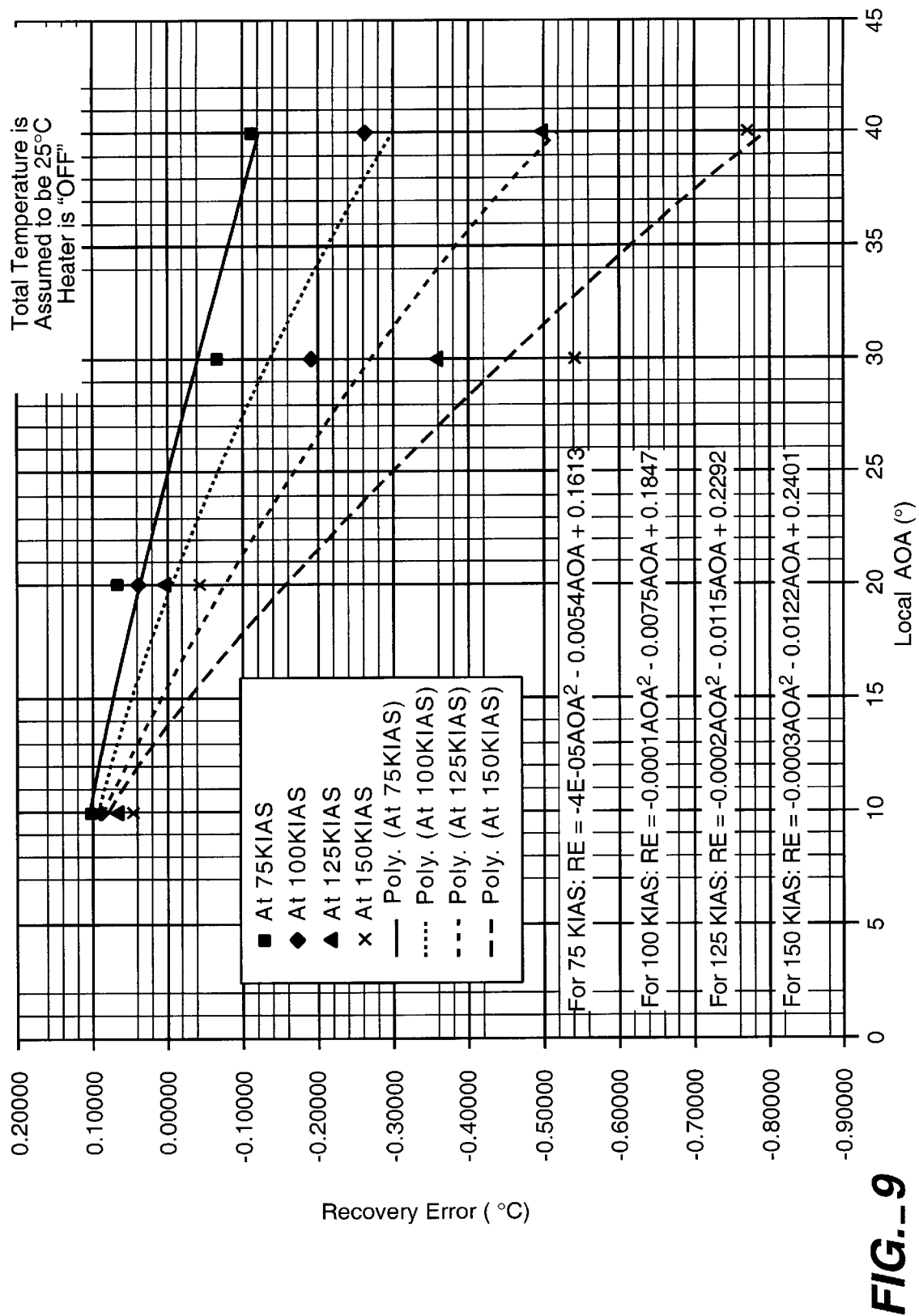
FIG._9

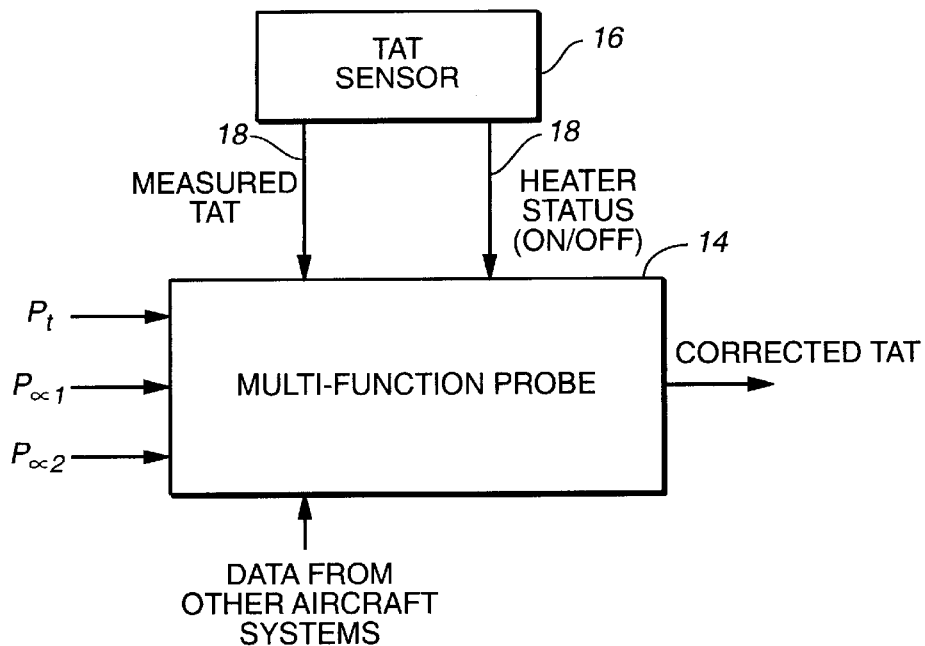
FIG._10
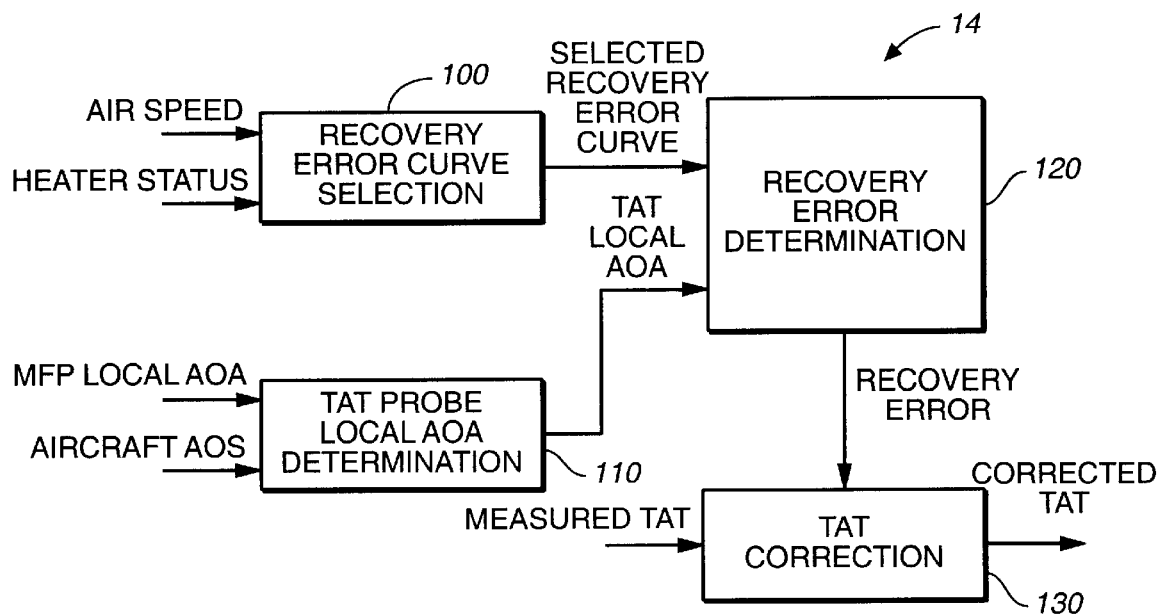
FIG._11

METHOD OF REDUCING TOTAL TEMPERATURE ERRORS AND MULTI-FUNCTION PROBE IMPLEMENTING SAME

CROSS-REFERENCE TO RELATED APPLICATIONS

Cross reference is made to U.S. application Ser. No. 09/851,289, filed May 8, 2001, entitled "MULTI-FUNCTION AIR DATA PROBES USING NEURAL NETWORK FOR SIDESLIP COMPENSATION"; U.S. application Ser. No. 09/850,863, filed May 8, 2001, entitled "METHOD TO CALCULATE SIDESLIP ANGLE AND CORRECT STATIC PRESSURE FOR SIDESLIP EFFECTS USING INERTIAL INFORMATION"; U.S. application Ser. No. 09/851,485, filed May 8, 2001, entitled "ITERATIVE METHOD OF AIRCRAFT SIDESLIP COMPENSATION FOR MULTI-FUNCTION PROBE AIR DATA SYSTEMS"; and U.S. application Ser. No. 09/850,796, filed May 8, 2001, entitled "SIDESLIP CORRECTION FOR A MULTI-FUNCTION THREE PROBE AIR DATA SYSTEM," which are herein incorporated by reference.

BACKGROUND OF THE INVENTION

The present invention relates to multi-function air data sensing probes (multi-function probes or MFPs) and to total air temperature (TAT) sensors or probes. More particularly, the present invention relates to correction of TAT recovery errors.

Modern jet power aircraft require very accurate measurements of outside air temperature (OAT) for inputs to the air data computer and other airborne systems. The outside air temperature is depended upon, among other things, the total air temperature (TAT) or ($T_t$). The TAT is the maximum air temperature which can be attained by 100% conversion of the kinetic energy of the flight. The TAT is measured using a TAT sensor or probe, which may or may not be integrated with a multi-function probe (MFP). TAT probes are taught, for example, in U.S. Pat. Nos. 5,653,538 and 5,731,507 which are herein incorporated by reference.

For TAT probes with de-icing heaters, application of the de-icing heat can cause the measured temperature ($T_m$) to increase at low air speeds. Basically, this effect is a conduction error, internal to the sensor, caused by the close proximity of heated portions of the sensor housing to the sensing element. This is known as de-icing heater error (DHE).

The recovery temperature $T_r$ is the adiabatic value of local air temperature on each portion of the aircraft surface due to incomplete recovery of the kinetic energy. Static air temperature (SAT or $T_s$) is the temperature of the undisturbed air through which the aircraft is about to fly. One parameter which relates the recovery temperature $T_r$ to the TAT and SAT is called the recovery factor r, which is defined as shown in Equation 1:

$$r = \frac{T_r - T_s}{T_t - T_s} \quad \text{EQ. 1}$$

The recovery factor is the proportion of kinetic energy converted to heat. A recovery factor of unity means all kinetic energy is converted to heat. In such cases, the recovery temperature $T_r$ is equal to the total temperature. The recovery error is the per unit or fractional total temperature error.

When large local flow angles approach TAT probes, both recovery error and DHE can be large enough to move outside of acceptable limits. The local flow angles are a function or probe placement on the aircraft and flight envelope conditions. Recovery error and DHE are particularly large at low speeds. This also happens to be where the aircraft has the most extreme values of angle of attack (AOA) and angle of sideslip (AOS). The extreme aircraft angles are what cause the extreme local AOAs. A method of accurately measuring the TAT at larger angles of attack would be a significant improvement in the art.

Multi-function probes or MFPs are used in air data systems to provide, among other things, accurate compensation of sideslip of an air vehicle. These MFPs are independent probes that are not pneumatically coupled, but which have processors for interchanging electrical signals between the probes. One type of MFP is the SmartProbe™ sold by the Goodrich Corporation. Multi-function probes include processing circuitry located at the probe itself as part of its instrument package. MFPs can be used, for example, to calculate an MFP local AOA, an aircraft AOA, and an aircraft AOS in addition to airspeed, altitude and Mach number.

SUMMARY OF THE INVENTION

A method of generating, for an aircraft, a total air temperature compensated for recovery or deicing heater error includes measuring a total air temperature with a total air temperature probe. A local angle of attack for the total air temperature probe is determined. Then, a corrected total air temperature, compensated for recovery or deicing heater error, is generated as a function of the measured total air temperature and the determined local angle of attack for the total air temperature probe.

BRIEF DESCRIPTION OF THE DRAWINGS

FIG. 1 is a schematic representation of a cross section of a nose portion of an aircraft showing placement of an air data sensing probe called a multi-function probe (MFP) made and configured to function in accordance with the present invention in one form, and a total air temperature sensing probe.

FIG. 2 is a schematic representation of a cross section of the nose portion of the aircraft showing an integrated MFP and TAT probe in accordance with the present invention in a second form.

FIG. 3 is a block diagram illustrating circuitry of one or more of the MFPs, with circuitry including an air data computer in some embodiments of the invention.

FIG. 4 is a plot illustrating a correlation between a local angle of attack at the MFP and a local angle of attack at the TAT probe, for an aircraft angle of side-slip of 0°.

FIG. 5 is a plot illustrating the relationship shown in FIG. 4, but for a range of aircraft angles of sideslip in conjunction with nominal aircraft angles of attack.

FIG. 6 is a plot illustrating typical uncorrected recovery error percentage as a function of the local angle of attack at the TAT probe.

FIG. 7 is a plot illustrating the relationship between local angle of attack at the TAT probe and an aircraft angle of attack for both the left hand side (LHS) and right hand side (RHS) of an aircraft under combinations of aircraft angle of attack.

FIGS. 8 and 9 are plots illustrating sets of recovery error correction curves as a function of local angle of attack at the TAT probe, for heater on and heater off conditions, respectively.

FIG. 10 is a block diagram illustrating a TAT probe error correction system in accordance with embodiments of the invention for a specific total temperature.

FIG. 11 is a block diagram illustrating processor circuitry functions of the MFPs of the present invention in which TAT error correction is implemented.

DETAILED DESCRIPTION OF THE PREFERRED EMBODIMENTS

FIG. 1 is a schematic representation of a nose portion of an aircraft (indicated generally at 10). As shown in FIG. 1, airplane 10 includes a mounted MFP 14 and a TAT probe 16. TAT probe 16 can be a probe such as shown in U.S. Pat. No. 5,653,538, to Phillips, entitled "TOTAL TEMPERATURE PROBE", or such as shown in U.S. Pat. No. 5,731,507, to Hagen et al., entitled "INTEGRAL AIRFOIL TOTAL TEMPERATURE SENSOR". TAT probe 16 can also be of other designs.

TAT probe 16 measures the total temperature of an airflow (shown diagrammatically at 17) as the airflow is brought to rest, without removal or addition of heat. TAT probe 16 provides an output 18 which is indicative of the measured TAT. Output 18, which is provided to MFP 14 (and optionally to a separate air data computer 38) can be a resistance value indicative of the TAT measured by probe 16. As will be discussed below in greater detail, when airflow 17 approaches TAT probe 16 at large flow angles, both recovery error and de-icing heater error (DHE) can be large enough to move outside of acceptable limits. The recovery error and DHE are particularly large at low aircraft airspeeds.

Multi-function probe 14 can be one of multiple MFPs mounted on the nose portion of aircraft 10. A multi-function probe or MFP is defined as an air data sensing probe in which a computer is integrally attached as a processor to the probe, and the sensing portions of the probe itself protrude in the airstream that moves past the aircraft skin. The processor is an integrated housing immediately inside the skin. The outputs from MFPs are digital electrical signals representing pressures derived from sampling multiple pressure readings from internal pressure sensors. The internal pressure sensors of an MFP can be either differential sensors or absolute sensors that receive the pressure signals and convert them into electrical signals that are then digitized. In some embodiments of the invention, the TAT correction or compensation methods disclosed herein are implemented within an air data computer (ADC) embodied in the processing circuitry integral to the MFP housing, or within multiple ADCs located within multiple MFPs. In yet other embodiments, the methods are implemented within an optional ADC 38 which is coupled to, but located remote from, the MFP 14.

Multi-function probe 14 may be a probe such as that shown in the U.S. Pat. No. 4,378,696, or other similar patents. As shown schematically in FIG. 1, the probe has barrel 14A with a suitable port for sensing pitot pressure at a leading end of the probe indicated at 14B. Angle of attack sensing ports are placed on the top and bottom of the probe, and the top port is illustrated schematically at 14C. A mating port is on the lower portion, as is well known, for measuring the angle of attack by sensing the differentials in pressure between the upper port and the lower port. The lower port on probe 14 senses a pressure designated $P\alpha_1$, and the upper port shown at 14C senses a pressure designated $P\alpha_2$.

The electronics within instrument housings 14D is electrically coupled to TAT probe 16 via electrical connection 24. Electrical connection 24 can be a data bus, electrical cables, or other types of communication pathways for communicating information. Also shown in FIG. 1 is the optional remote ADC 38 within which the methods of the present invention can be implemented. However, in embodiments of the invention, the TAT error reducing techniques of the present invention are implemented within an ADC contained within the housings 14D associated with MFP 14. In these embodiments, optional ADC 38 can be omitted if desired.

FIG. 2 is a schematic illustration of a portion of a air data sensing probe 19 which can be used in some embodiments of the present invention. Probe 19 includes the TAT probe 16 formed integrally with the MFP 14. With the exception of the functions of probes 14 and 16 being integrated into a single probe 19, probes 14 and 16 of integral air data sensing probe 19 function substantially the same as described with reference to FIG. 1, and as described further below. Probe 19 shown in FIG. 3 also includes an instrument housing, similar to instrument housing 14D shown in FIG. 1.

The arrangement of the circuitry in one example embodiment of an MFP 14 is shown in block diagram form in FIG. 3. Multi-function probe circuitry 23 is shown schematically coupled to probe 14. Circuitry 23 is positioned within the corresponding housing 14D and in the illustrated embodiment comprises an air data computer (ADC). Inputs are illustrated schematically as the $\alpha_1$ pressure port 14E $\alpha_2$ pressure port 14C and the total pressure port 14B. The $\alpha_2$ pressure port and total pressure port correspond to those shown in FIG. 2 for probe 14. The $\alpha_1$ pressure port corresponds to the lower port (not shown in FIG. 1) on the probe.

These pressures are transmitted through a manifold 30 to individual pressure sensors 32, 33 and 34, respectively. The outputs of pressure sensors 32, 33 and 34 are provided to analog-to-digital converter 35 for digitization. Processing and communications circuitry 37 includes a microcontroller 36 and related memory and communications circuits all forming part of the ADC (i.e., circuitry 23). The ADC can also include other circuits and devices such as electromagnetic filters for reducing EMI interference, heater control circuits, and power supplies. Air data computer or circuitry 23 also includes and/or is coupled to data bus 24 for receiving information from, or transmitting information to, other devices such as TAT probe 16 and other MFPs in the system. The methods of the present invention can be implemented within the air data computers of one or more MFPs, or can be implemented in a separate and remotely positioned air data computer.

As noted previously, if local angles of attack on the TAT probe 16 exceed about ±10°, the errors have largely been considered unacceptable in the prior art. The present invention is based, in part, upon the recognition that if information from a nearby MFP can be used to estimate the local AOA at probe 16, then the error can be reduced. It has been found that, for at least some TAT probe implementations, the recovery error is within acceptable limits at all speeds and all parts of the flight envelope when the heater of the TAT probe is turned off. However, in at least some configurations of TAT probe 16, if the heater is turned on, the errors are too large when local AOA is beyond 10°. In accordance with the present invention, using a quadratic curve fit to account for the TAT probe recovery error associated with local (to the TAT probe) AOA would reduce the TAT recovery error and the DHE to acceptable levels. This allows the extension of the range of local AOA where the TAT probe 16 functions within specification. The invention utilizes the ability of MFP 14 to calculate parameters such as local AOA, TAT heater state, and even aircraft parameters such as AOA and AOS that might influence the relationship between local AOA at the MFP 14 and local AOA at the TAT probe 16.

It has been found that there are two separate modes of operation for the TAT probe, heater "ON" and "OFF", which must be considered when addressing recovery errors in the TAT probe operation. As discussed above, at low speeds and high angles of local AOA, the recovery errors of the TAT probe go beyond the range of acceptability. Specifically, in at least some TAT probe designs, when the local AOA goes beyond ±10° with the heater on, the recovery errors exceed acceptable limits. An investigation was initiated to correlate information from an MFP located near a TAT probe to correct for local AOA and airspeed. For one particular TAT probe design and for a particular aircraft, the trends in the data taken were such that over the range of 75 to 150 KIAS (knot indicated airspeed) local airspeed, the recovery error was less than 0.5° C. up to local AOAs of 25 degrees if the heater was off when the nominal total temperature was assumed to be 25° C. As the speed increases, the error increases slightly, but the expected aircraft flight envelope should be limited in AOS at the higher speeds (and higher altitude) to the point that a heater off condition is of little concern. When the heater power is "ON" in the TAT probe however, the error was greater than 0.5° C. when the local AOA was over 10°.

FIG. 4 is a plot illustrating the relationship, for one particular implementation, of the local AOA at the TAT probe 16 and the local AOA at the MFP 14, when the aircraft AOS is zero. As can be seen in FIG. 4, when the aircraft AOS is zero there is a direct, linear, correlation between the MFP local AOA and the local AOA at the TAT probe. The data shown in FIG. 4 was taken for Mach (M) of 0.2. However, when aircraft AOS is considered, the correlation is not as direct. FIG. 5 shows data for a range of aircraft AOS that correlate the local AOA at the TAT probe and the local AOA at the MFP. At low aircraft AOA, the changes in local AOA at the TAT probe is more sensitive to AOS than it is at higher aircraft AOA in this particular example. At medium aircraft AOA, the sensitivity to AOS is less and at the highest aircraft AOA, the sensitivity is the least.

Considering the results if AOS is neglected as a factor to determine the level of correction, one can assume for discussion purposes that the local AOA at the TAT probe is what is predicted by the equation shown in FIG. 4. The local AOA at the TAT probe can then be correlated to the actual TAT probe local AOA for purposes of comparison. As an example, at an aircraft AOA of −70 and an aircraft AOS of 15°, the local AOA at the MFP would be −35.1° or −12.0° (depending on which side the wind is coming from). Using the equation in FIG. 4, the predicted local AOA at the TAT probe would be −32.8° or −8.5°. In comparison, the actual value of the local AOA at the TAT probe would be −25.3° or −14.5°. Generally, the local AOA at the MFP is determined for an aircraft condition. The local AOA at the TAT probe can be predicted using a relationship such as shown in the equation in FIG. 4. The "error" is now how much the AOS has influenced the local AOA at the TAT probe. The local AOA at the TAT probe can then be compensated for AOS.

Turning to the TAT data shown in FIG. 6, the recovery error is shown for one example implementation in the heater power "ON" condition as a function of local AOA at approximately Mach 0.2. FIG. 7 illustrates the relationship between local AOA and aircraft AOA in one example.

At a local AOA of −32.8°, the correction predicted would be about 2.45% and at a local AOA of −25.3°, the correction prediction would be 1.53% based on a modified quadratic curve fit for the experimental data (in this case a positive local AOA has the same impact on recovery error as does a negative local AOA). Thus, in neglecting sideslip, the error would be about 0.92%. In air at 25° C., this translates to about 2.75° C. of error. On the other side, a correction at an assumed −8.5° local AOA would be zero, but the actual local AOA of −14.5 would introduce an error of approximately 0.45% or 1.35° C. in standard air. This means that if one is to correct for local AOA, it is difficult to use information at one MFP only to get a local AOA and to use that local AOA to predict the local AOA at the TAT probe without introducing significant error. In the example analysis for a particular implementation, the low aircraft AOA seems to introduce the most error if aircraft AOS is neglected. The conclusion is that aircraft AOS must be accounted for to determine local AOA in order to maintain 0.5° C. accuracy over the entire flight envelope. If the local AOA determined by an MFP is used to predict the local AOA at the TAT probe (for example using the equation shown in FIG. 4 for one embodiment), the "error" now is how much the AOS has influenced the actual value of the local AOA at the TAT probe, and appropriate correction can be made.

Methods can be used to determine aircraft AOS, for example using separate symmetrically mounted MFPs. Generally, method of calculating aircraft AOS are well known in the art. The aircraft AOS calculations can be implemented within MFP 14, or implemented remotely and provided to MFP 14. The invention is not limited by choice of AOS calculation method.

After determination of the aircraft AOS, the determination of local AOA at the TAT probe 16 can be done using a two-dimensional look-up table with the inputs being local AOA at the MFP 14 and aircraft AOS. Once the local AOA at TAT probe 16 is known, curves such as those shown in FIGS. 8 and 9 can be used to determine the appropriate recovery error correction.

FIGS. 8 and 9 illustrate quadratic curves which correlate the recovery error for a TAT probe to the TAT probe's local AOA with the heater in the "ON" and "OFF" conditions, respectively. In each of the figures, a different curve (error-AOA relationship) is provided for different airspeeds. Functions for each of the recovery error curves in FIGS. 8 and 9 are also provided. It must be noted that the curves shown in FIGS. 8 and 9, as well as the related functions, are examples for one particular TAT probe design and configuration, and do not limit the invention to these particular curves or functions. In this case, an additional correlation between the aircraft flight conditions based on information in the Air Data system and the local airspeed at the TAT probe must be made. Note that the uncorrected error decreases as local speed increases.

FIG. 10 is a block diagram illustrating a system for providing a TAT with reduced recovery errors in accordance with the invention. As shown in FIG. 10, TAT probe or sensor 16 provides at output(s) 18 an indication of the TAT measured by that probe. Optionally, TAT probe 16 provides at output 18 an indication of the status (ON/OFF) of the TAT probe heater. If TAT probe 16 does not provide the heater status, MFP 14 can obtain this information from other sources.

In addition to the measured TAT and the heater status, MFP 14 receives as inputs the pressures $P_t$, $P_{\alpha 1}$ and $P_{\alpha 2}$ described above. Using these inputs, a local AOA at the MFP can be calculated as is known in the art. Using these inputs and data from other aircraft systems (for example other MFPs), an aircraft AOS can be calculated within MFP 14.

The aircraft AOS can also be determined elsewhere and provided to MFP 14. Using a look-up table or other methods such as derived correlation functions, the local AOA at MFP 14 and the aircraft AOS can be used to estimate a local AOA at TAT probe 16.

Once MFP 14 has estimated a local AOA for TAT probe 16, an appropriate recovery error curve can be selected for use in correcting the TAT. Selection of the appropriate recovery error function or curve is dependent upon the heater status and the local airspeed (knots indicated airspeed) as is shown in FIGS. 8 and 9, for example. Once the appropriate recovery error curve is selected, the processing circuitry within MFP 14 provides a corrected TAT estimation as an output.

FIG. 11 is a block diagram illustrating the recovery error correction function implemented by MFP 14 in greater detail. As shown in FIG. 11, the processing circuitry in MFP 14 can be considered to implement a recovery error curve selection function 100, a TAT probe local AOA determination function 110, a recovery error determination function 120 and a TAT correction function 130. As discussed above, recovery error curve selection function 100 (recovery error curve selector) receives as inputs the indicated airspeed of the aircraft and the heater status. The indicated airspeed input can be calculated within MFP 14, or can be provided in the data from other aircraft systems if desired. Selection of the appropriate recovery error curve can be generally as described above. For example, using the heater status input, initially recovery error curve selector 100 selects one of first and second sets of recovery error curves corresponding to the heater status (i.e., sets of curves such as those shown in FIG. 8 or in FIG. 9). Then, using the indicated airspeed input, recovery error curve selector 100 selects the appropriate one of the set of curves for the particular airspeed of the aircraft interpolating if necessary.

The TAT probe local AOA determination function 110 (TAT probe local AOA determiner) can estimate the local AOA at TAT probe 16 generally as described above. For example, the MFP local AOA calculated within MFP 14 and the aircraft AOS can be used as inputs to a two-dimensional look-up table to select the appropriate TAT probe local AOA. The values within the look-up table can be established using Computational Fluid Dynamics (CFD) testing, modeling, or by other methods. In the alternative, functions describing the relationship between the TAT probe local AOA and combinations of MFP local AOA and aircraft AOS can be identified and used in TAT probe local AOA determiner 110.

Using the selected recovery error curve and the estimated TAT probe local AOA as inputs, recovery error determination function 120 (recovery error determiner) identifies the recovery error for the particular TAT probe local AOA. Referring back to FIGS. 8 and 9 for the moment, it can be seen that in some implementations recovery error is negligible for local AOAs below a threshold (in the illustrated embodiment, 10°). Thus, in this range of local AOAs, the recovery error can be ignored or set to a predetermined small value. Once the recovery error is determined for the particular TAT probe operation conditions, the measured TAT can be corrected using the determined recovery error to provide a corrected TAT. Thus, the range of operating conditions (specifically the local AOA of the TAT probe) in which the TAT is considered to be reliable can be greatly extended as compared to conventional systems.

Although the present invention has been described with reference to preferred embodiments, workers skilled in the art will recognize that changes may be made in form and detail without departing from the spirit and scope of the invention. These and other embodiments of the disclosed method are within the scope of the invention.

What is claimed is:

1. A method of generating for an aircraft a total air temperature compensated for recovery or deicing heater error, the method comprising:

measuring a total air temperature with a total air temperature probe;

determining a local angle of attack for the total air temperature probe; and generating a corrected total air temperature, compensated for recovery or deicing heater error, as a function of the measured total air temperature and the determined local angle of attack for the total air temperature probe.

2. The method of claim 1, and further comprising:

identifying an airspeed; and wherein generating the corrected total air temperature further comprises generating the corrected total air temperature as a function of the measured total air temperature, the airspeed, and the determined local angle of attack for the total air temperature probe.

3. The method of claim 2, and further comprising:

identifying a heater ON/OFF status of a heater of the total air temperature probe; and wherein generating the corrected total air temperature further comprises generating the corrected total air temperature as a function of the measured total air temperature, the determined local angle of attack for the total air temperature probe, the airspeed, and the heater ON/OFF status.

4. The method of claim 3, wherein the step of determining the local angle of attack for the total air temperature probe further comprises using processing circuitry of a multi-function probe to calculate a local angle of attack for the multi-function probe and to determine the local angle of attack for the total air temperature probe as a function of the local angle of attack for the multi-function probe.

5. The method of claim 4, wherein the step of determining the local angle of attack for the total air temperature probe further comprises determining the local angle of attack for the total air temperature probe also as a function of an aircraft angle of sideslip.

6. The method of claim 5, wherein the step of generating the corrected total air temperature further comprises generating the corrected total air temperature using the processing circuitry of the multi-function probe.

7. The method of claim 6, wherein the step of generating the corrected total air temperature further comprises:

selecting an error-angle of attack relationship based upon the airspeed;

identifying an error as a function of the local angle of attack for the total air temperature probe using the selected error-angle of attack relationship; and generating the corrected total air temperature from the measured total air temperature and the error.

8. The method of claim 7, wherein selecting the error-angle of attack relationship comprises selecting an error equation based upon the airspeed.

9. The method of claim 8, wherein the airspeed is a local airspeed of the total air temperature probe.

10. The method of claim 7, wherein selecting an error-angle of attack relationship based upon the airspeed further comprises:

selecting one of first and second sets of error-angle of attack relationships based upon the identified heater ON/OFF status; and selecting the error-angle of attack relationship, from the selected one of the first and second sets of error-angle of attack relationships, based upon the airspeed.

11. A multi-function probe for air data sensing comprising:
- a barrel having a plurality of pressure sensing ports for sensing a plurality of pressures;
- instrumentation coupled to the plurality of pressure sensing ports for providing electrical signals indicative of the plurality of pressures;
- an input receiving a measured total air temperature from a total air temperature probe; and
- processing circuitry coupled to the instrumentation and the input and configured to determine a local angle of attack for the total air temperature probe as a function of the electrical signals indicative of the plurality of pressures, the processing circuitry further being configured to generate a corrected total air temperature, which is compensated for recovery and deicing heater error, as a function of the measured total air temperature and the determined local angle of attack for the total air temperature probe.

12. The multi-function probe of claim 11, wherein the processing circuitry is further configured to generate the corrected total air temperature as a function of an airspeed.

13. The multi-function probe of claim 12, wherein the airspeed is a local airspeed of the total air temperature probe.

14. The multi-function probe of claim 12, wherein the processing circuitry is further configured to generate the corrected total air temperature as a function of a heater ON/OFF status of a heater of the total air temperature probe.

15. The multi-function probe of claim 14, wherein the processing circuitry is further configured to determine a local angle of attack for the multi-function probe as a function of the electrical signals indicative of the plurality of pressures, and to determine the local angle of attack for the total air temperature probe as a function of the local angle of attack for the multi-function probe.

16. The multi-function probe of claim 15, wherein the processing circuitry is configured to generate the corrected total air temperature by performing the steps comprising:
- selecting an error-angle of attack relationship based upon the airspeed of the aircraft;
- identifying an error as a function of the local angle of attack for the total air temperature probe using the selected error-angle of attack relationship; and
- generating the corrected total air temperature from the measured total air temperature and the identified error.

17. The multi-function probe of claim 16, wherein the processing circuitry is configured to select the error-angle of attack relationship based upon the airspeed of the aircraft by performing the steps comprising:
- selecting one of first and second sets of error-angle of attack relationships based upon the identified heater ON/OFF status; and
- selecting the error-angle of attack relationship, from the selected one of the first and second sets of error-angle of attack relationships, based upon the airspeed of the aircraft.

* * * * *